(12) United States Patent
Erickson

(10) Patent No.: US 9,422,088 B1
(45) Date of Patent: Aug. 23, 2016

(54) ATTACHABLE STORAGE CONTAINER APPARATUS

(71) Applicant: LJA Companies, LLC, Taylor Falls, MN (US)

(72) Inventor: Chad Steven Erickson, Center City, MN (US)

(73) Assignee: LJA Companies, LLC, Taylor Falls, MN (US)

( * ) Notice: Subject to any disclaimer, the term of this patent is extended or adjusted under 35 U.S.C. 154(b) by 381 days.

(21) Appl. No.: 13/951,998

(22) Filed: Jul. 26, 2013

Related U.S. Application Data

(60) Provisional application No. 61/676,620, filed on Jul. 27, 2012.

(51) Int. Cl.
| | | |
|---|---|---|
| *B65D 6/00* | (2006.01) | |
| *B05B 9/01* | (2006.01) | |
| *A47K 10/38* | (2006.01) | |
| *B65D 25/24* | (2006.01) | |
| *B23P 17/00* | (2006.01) | |

(52) U.S. Cl.
CPC ............... *B65D 25/24* (2013.01); *B23P 17/00* (2013.01)

(58) Field of Classification Search
CPC ...... B65D 11/20; B65D 25/24; B65D 23/001; B23P 17/00
USPC ............ 220/625, 729, 23.6, 23.4, 23.83, 526, 220/524, 4.24, 4.27; 206/494, 745; 222/129, 192
See application file for complete search history.

(56) References Cited

U.S. PATENT DOCUMENTS

| | | | |
|---|---|---|---|
| 373,752 A | 2/1888 | Ader | |
| 1,903,312 A | 4/1933 | Ellis | |
| 1,942,953 A | 1/1934 | Bennett | |
| 2,326,414 A * | 8/1943 | Thompson | 220/4.27 |
| 3,523,653 A * | 8/1970 | Hansen | 242/593 |
| 4,054,220 A | 10/1977 | Rosenstein | |
| 4,273,459 A | 6/1981 | Hardy | |
| 4,795,028 A | 1/1989 | Wittig et al. | |
| 5,165,546 A | 11/1992 | Jaeger et al. | |
| 5,531,353 A | 7/1996 | Ward et al. | |
| 5,671,872 A | 9/1997 | Daniels, Jr. | |
| 5,819,989 A | 10/1998 | Saraceni | |
| 6,082,595 A | 7/2000 | Lin | |
| 6,138,874 A | 10/2000 | Audrey | |
| 6,216,920 B1 | 4/2001 | Baggett | |
| 6,321,937 B1 * | 11/2001 | DeSimone et al. | 221/45 |
| 6,431,405 B2 | 8/2002 | Irwin | |
| 6,644,563 B2 | 11/2003 | Presson | |

(Continued)

*Primary Examiner* — Chun Cheung
(74) *Attorney, Agent, or Firm* — Berggren Law Offices, LLC; William B. Berggren; Stephen F. Wolf

(57) ABSTRACT

A storage container apparatus for use with commercial material containers that includes three elements. The first element is compartment sides having a substantially horizontal surface, an outer top edge that is within 0.25 inches of the sides proximate the bottom of a commercial material container, and a contour that extends downward and ends in an edge with a first attachment element. The second element is a compartment base with a top, a bottom, and an edge, the top having a second attachment element that detachably attaches to the first attachment element of the sides and the edge extends outward from the attachment element at least 0.13 inches. The third element is a joining element that is configured to affix the storage compartment proximate to the bottom of a commercial material container.

21 Claims, 14 Drawing Sheets

(56) References Cited

U.S. PATENT DOCUMENTS

| | | |
|---|---|---|
| 6,945,416 B2 | 9/2005 | Manno |
| 7,303,347 B1 | 12/2007 | Duncan |
| 7,585,125 B2 | 9/2009 | Muhlhausen |
| 7,743,947 B2 | 6/2010 | Flasch |
| 2004/0182886 A1 | 9/2004 | McKay |
| 2005/0133538 A1 | 6/2005 | Herrmann |
| 2006/0016712 A1* | 1/2006 | Simmons ............... 206/494 |
| 2006/0102585 A1 | 5/2006 | Richardson |
| 2006/0186144 A1 | 8/2006 | Tinsley |
| 2008/0049415 A1 | 2/2008 | McKay, Sr. |

* cited by examiner

Commercial Containers with Ridges Proximate Bottom

| Product | Company | Shape & Volume, Fl. Oz. | Bottom Dimension inches | Bottom Ridge inches |
|---|---|---|---|---|
| Greased Lightning cleaner and degreaser | Home Care Labs, Inc Lawrenceville, GA | Round 32.0 | 3.5 diameter, 11.0 circumference | 0.5 raised |
| Greased Lightning Orange Blast cleaner and degreaser | Home Care Labs, Inc Lawrenceville, GA | Round 32.0 | 3.5 diameter, 11.0 circumference | 0.5 raised |
| SC Johnson Professional Heavy Duty Degreaser | SC Johnson & Sons, Inc, Racine, WI | Round 32.0 | 3.25 diameter, 10.21 circumference | 0.5 raised |
| SC Johnson Professional Shower & Tub Cleaner | SC Johnson & Sons, Inc, Racine, WI | Round 32.0 | 3.25 diameter, 10.21 circumference | 0.5 raised |
| SC Johnson Professional Grout Cleaner | SC Johnson & Sons, Inc, Racine, WI | Round 32.0 | 3.25 diameter, 10.21 circumference | 0.5 raised |
| Stone Care International Counter Top Cleaner | Stone Care International, Inc. Owings Mills, MD | Round 22.0 | 3" diameter, 9.42 circumference | 0.63 raised |
| Crown RV & Boat Cleaner | Crown Marketing, Inc. Nicholasville, KY | Round 32.0 | 3.38 diameter, 10.63 circumference | 0.5 raised |
| Rubbermaid 32oz Heavy Duty Spray Bottle | Newell Rubbermaid Wooster OH, | Round 32.0 | 3.38 diameter, 10.63 circumference | 0.5 raised |
| Mr Clean Professional disinfecting restroom cleaner | Procter & Gamble, Cincinnati, OH | Square 32.0 | 3.75 x 3.75(back) to 3.0 (front), | 0.5 raised |
| Mr Clean Professional disinfecting multi purpose cleaner | Procter & Gamble, Cincinnati, OH | Square 32.0 | 3.75 x 3.75(back) to 3.0 (front), | 0.5 raised |
| Mr Clean Professional disinfecting cleaner with bleach | Procter & Gamble, Cincinnati, OH | Square 32.0 | 3.75 x 3.75(back) to 3.0 (front), | 0.5 raised |
| Mr Clean Professional Glass Cleaner | Procter & Gamble, Cincinnati, OH | Square 32.0 | 3.75 x 3.75(back) to 3.0 (front), | 0.5 raised |
| Mr. Clean Professional heavy duty degreaser | Procter & Gamble, Cincinnati, OH | Square 32.0 | 3.75 x 3.75(back) to 3.0 (front), | 0.5 raised |

FIG. 1

Commercial Containers with Ridges Proximate Bottom

| Product | Company | Shape & Volume, Fl. Oz. | Bottom Dimension, inches | Bottom Ridge inches |
|---|---|---|---|---|
| Tech Grout Cleaner (includes grout brush, plastic wrapped and tie strapped to outside) | Tech Enterprises Inc. Madison, WI | Rectangular 32.0 | 4.0 x 2.5 | 0.5 raised |
| Tech final answer carpet cleaner and spot remover | Tech Enterprises Inc. Madison, WI | Rectangular 32.0 | 4.0 x 2.5 | 0.5 raised |
| Green Works Glass Cleaner | Clorox Company Oakland, CA | Rectangular 32.0 | 4.0 x 3.0 | 0.5 raised |
| Green Works all purpose cleaner | Clorox Company Oakland, CA | Rectangular 32.0 | 4.0 x 3.0 | 0.5 raised |
| Green Works natural glass and surface cleaner, Commercial Solutions | Clorox Company Oakland, CA | Rectangular 32.0 | 4.0 x 3.0 | 0.5 raised |
| 409 Stone and Steel Cleaner | Clorox Company Oakland, CA | Rectangular 32.0 | 4.0 x 3.0 | 0.5 raised |
| 409 Glass and Surface Cleaner | Clorox Company Oakland, CA | Rectangular 32.0 | 4.0 x 3.0 | 0.5 raised |
| 409 All Purpose Cleaner | Clorox Company Oakland, CA | Rectangular 32.0 | 4.0 x 3.0 | 0.5 raised |
| Tilex Bathroom Cleaner Lemon Scent | Clorox Company Oakland, CA | Rectangular 32.0 | 4.0 x 3.0 | 0.5 raised |
| Tilex Mold and Mildew Remover | Clorox Company Oakland, CA | Rectangular 32.0 | 4.0 x 3.0 | 0.5 raised |
| Tilex Fresh Shower | Clorox Company Oakland, CA | Rectangular 32.0 | 4.0 x 3.0 | 0.5 raised |
| Simple Green All-Purpose Cleaner Lemon Scent | Sunshine Makers, Inc. Huntington Beach, CA | Rectangular 32.0 | 4.0 x 2.8 | 0.5 raised |
| Concentrated Simple Green All-Purpose Cleaner | Sunshine Makers, Inc. Huntington Beach, CA | Rectangular 32.0 | 4.0 x 2.8 | 0.5 raised |

FIG. 2

Commercial Containers with Ridges Proximate Bottom

| Product | Company | Shape & Volume, Fl. Oz. | Bottom Dimension, inches | Bottom Ridge inches |
|---|---|---|---|---|
| Clorox Kitchen Cleaner + Bleach (can use on Granite and Stainless Steel) Floral Scent | Clorox Company Oakland, CA | Rectangular 32.0 | 4.0 x 3.0 | 0.5 raised |
| Clorox Clean-up Cleaner Plus Bleach Citrus Scent | Clorox Company Oakland, CA | Rectangular 32.0 | 4.0 x 3.0 | 0.5 raised |
| Clorox Clean-up Cleaner with Bleach Fresh Scent | Clorox Company Oakland, CA | Rectangular 32.0 | 4.0 x 3.0 | 0.5 raised |
| Clorox Clean-up Cleaner with Bleach Original Scent | Clorox Company Oakland, CA | Rectangular 32.0 | 4.0 x 3.0 | 0.5 raised |
| Clorox Disinfecting Bathroom Cleaner | Clorox Company Oakland, CA | Rectangular 32.0 | 4.0 x 3.0 | 0.5 raised |
| Clorox Bleach Foamer for the Bathroom | Clorox Company Oakland, CA | Rectangular 32.0 | 4.0 x 3.0 | 0.5 raised |
| Meguiar's Vinyl and Rubber Cleaner & Protectant. (# 57 Marine-RV) | Meguiar's Inc. Irvine, CA | Rectangular 16.0 | 4.0 x 2.0 | 1.0 raised |
| Meguiar's Oxidation Remover Heavy Duty Cleaner (# 49 Marine-RV) | Meguiar's Inc. Irvine, CA | Rectangular 16.0 | 4.0 x 2.0 | 1.0 raised |
| Meguiar's Cleaner Wax One Step (# 50 Marine-RV) | Meguiar's Inc. Irvine, CA | Rectangular 16.0 | 4.0 x 2.0 | 1.0 raised |
| Meguiar's Cleaner Wax (Auto) | Meguiar's Inc. Irvine, CA | Rectangular 16.0 | 4.0 x 2.0 | 1.0 raised |
| Meguiars Hot Rims All Wheel & Tire Cleaner | Meguiar's Inc. Irvine, CA | Rectangular 24.0 | 5.0 x 2.0 | 0.5 raised |
| Meguiars High Gloss Hot Shine Tire Spray | Meguiar's Inc. Irvine, CA | Rectangular 24.0 | 5.0 x 2.0 | 0.5 raised |

FIG. 3

Commercial Containers with Smooth Sides Proximate Bottom

| Product | Company | Shape & Volume, Fl. Oz. | Bottom Diameter inches / Bottom Circumference inches | Bottom Edge |
|---|---|---|---|---|
| Lucas Slick Mist Tire & Trim Shine | Lucas Oil Products, Inc. Corona, CA | Round 24.0 | 2.75 diameter, 8.64 circumference | Smooth |
| Lucas Slick Mist Speed Wax | Lucas Oil Products, Inc. Corona, CA | Round 24.0 | 2.75 diameter, 8.64 circumference | Smooth |
| Whink Counter Top Cleaner | Whink Products Company, Eldora, IA | Rectangular 24.0 | 3.5 x 2.0 | Smooth |
| Whink Glass/Ceramic Cook Top Cleaner | Whink Products Company, Eldora, IA | Rectangular 24.0 | 3.5 x 2.0 | Smooth |
| Weiman Stainless Steel Cleaner & Polish | Weiman Products, LLC Gurnee, IL | Rectangular 12.0 | 3.5 x 2.0 | Smooth |
| Weiman Cooktop Daily Cleaner | Weiman Products, LLC Gurnee, IL | Rectangular 12.0 | 3.5 x 2.0 | Smooth |
| Weiman Granite Cleaner & Polish | Weiman Products, LLC Gurnee, IL | Rectangular 12.0 | 3.5 x 2.0 | Smooth |
| Weiman Heavy Duty Gas Range Degreaser | Weiman Products, LLC Gurnee, IL | Rectangular 12.0 | 3.5 x 2.0 | Smooth |
| Weiman Leather Cleaner & Conditioner | Weiman Products, LLC Gurnee, IL | Rectangular 12.0 | 3.5 x 2.0 | Smooth |
| Pledge Multi Surface Everyday Cleaner | S.C. Johnson & Son, Inc. Racine, WI | Rectangular 16.0 | 4.0 x 2.5 | Smooth |
| Pledge Furniture Spray Revitalizing Oil | S.C. Johnson & Son, Inc. Racine, WI | Rectangular 16.0 | 4.0 x 2.5 | Smooth |

FIG. 4

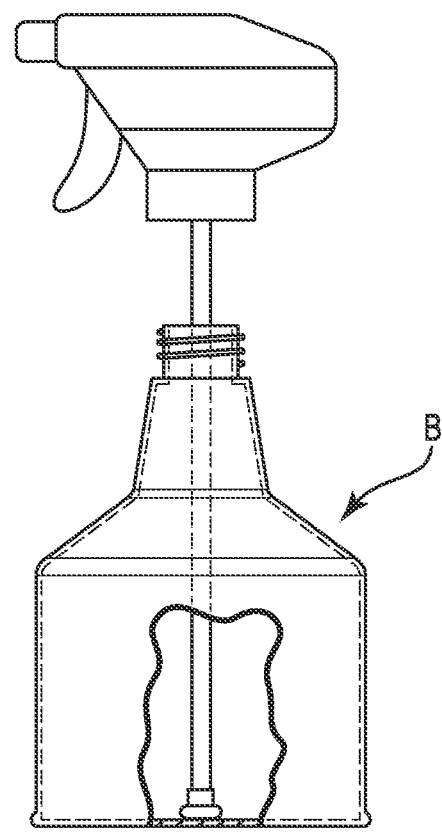
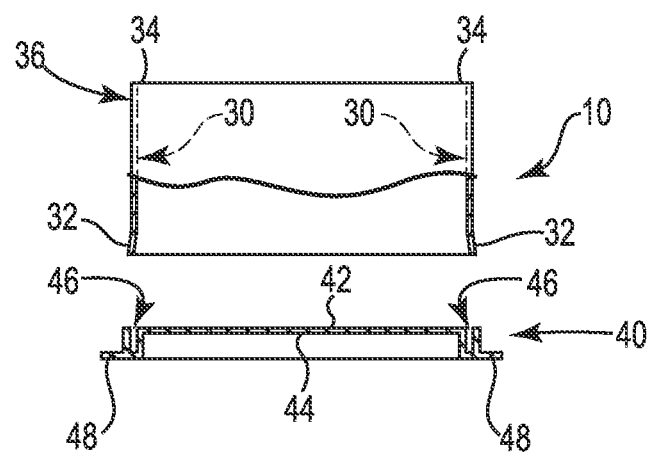
Fig. 11

ATTACHABLE STORAGE CONTAINER APPARATUS

FIELD OF THE INVENTION

This invention relates to material containers, with attachable bases and those bases with accessories therein.

BACKGROUND OF THE INVENTION

There is a need for storage containers that can be attached to existing commercial material containers.

Currently the marketplace is filled with material containers. These containers are durably made for such materials as, for example, solids such as cereal or coffee, liquids such as cleaners or weed killing materials, pastes such as shoe polish or cosmetic creams, and gases such as hair spray or other aerosol products.

Each material generally has accessories that are used often in conjunction with the material. These accessories may include, for example, funnels, measuring cups, and concentrates for reusable containers. They may also include for single use materials such accessories as, for example, disposable wipes, colorants, scouring or polishing pads, can openers, plumbing snakes, and so forth, the list is endless.

In addition, the user generally stores these accessories in different locations from that where the material containers are located. This presents the user with a challenge of assembling the needed materials and accessories when a task is to be performed.

A material container that contains an attachable base with or without at least one associated accessory is known. However, these relate to specific containers and bases that are sold as a unit and disposed of when the material is consumed. In addition, most material containers are not available with a specially designed base apparatus attached to the bottom of the container.

There is a need for a way to keep the commercial materials together with the needed accessories. This is especially true for accessories that are useful for the life of at least several if not many containers of material products and are easily misplaced if not attached to the containers.

SUMMARY OF THE INVENTION

I have invented an attachable storage container apparatus that can hold at least one accessory and can be attached to the bottom of at least two differently branded commercial material containers. The storage container apparatus comprises three elements. The first element is compartment sides having a substantially horizontal surface, an outer top edge that is within 0.25 inches of the sides proximate the bottom of a commercial material container, and a contour that extends downward and ends in an edge with a first attachment element. The second element is a compartment base with a top, a bottom, and an edge, the top having a second attachment element that detachably attaches to the first attachment element of the sides and the edge extends outward from the attachment element at least 0.13 inches. The third element is a joining element that is configured to affix the storage compartment proximate to the bottom of a commercial material container.

I have also invented a method of using an attachable storage container apparatus with one of at least two differently branded conventional material containers. The method comprises three steps. The first step is providing a commercial material container with material that ranges from solid to liquid to gas. The second step is providing the above storage container apparatus. The third step is engaging the joining element to attach the storage container apparatus proximate to the bottom of the conventional commercial material container.

As used herein:

"Concentrate" means a fluid-soluble concentrate in a pre-weighed amount that is dissolved that will thoroughly dissolve in a reasonable period of time of less than ten (10) minutes with water, alcohol, other fluids, or mixtures thereof.

"Disposable wipe" means a plurality of disposable sheets in a collection that permits dispensing of sheets one at a time such as, for example, toilet paper rolls, paper towel rolls and box or packet of tissue paper that are separated by scoring or an arrangement of individual sheets folded in an alternating interwoven stacked manner.

"Reusable wipe" means a reusable non-paper sheet or pad-wiping element for smoothly spreading dispensed fluid onto a surface or scouring or polishing a surface once fluid is dispensed. The element is composed of reusable material such as, for example, cloth, a micro-porous non-woven polymeric material or a membrane that is washable in a washing basin or conventional residential washing machine, reusable sponges, scouring pads such as, for example, SCOTCH-BRITE® by 3M Company of Maplewood, Minn., and clay bar used for polishing automotive surfaces.

My invention has several benefits over what is known. My invention permits a user to attach a storage container apparatus to one of most is not all substantially flat-bottomed material containers that previously was purchased for a use and place desirable accessories in the base to be used with the material. This is regardless of the shape of the sides of the commercial container or whether it has side ridges or protrusions, or has smooth sides. In addition, the extended edge provides addition al standing stability of the apparatus in combination with a commercial container. Moreover, the storage container apparatus can be opened from the bottom for easy access to the contents. Furthermore, the user may transfer that storage container apparatus to another material container of similar bottom dimensions for multiple reuses or even attach multiple stacks the storage container apparatus to a single material container for storage of additional accessories. This is particularly beneficial for accessories that can be used over the life of several single-use material containers. Also, a material container does not have to be specially designed to be releasably attached to the base apparatus.

BRIEF DESCRIPTION OF THE DRAWINGS

One or more features or forms of the invention are described in the accompanying drawings. The drawings are described briefly below.

FIG. 1 is a table showing the dimensions of the bottoms of various material containers having ridges proximate their bottoms.

FIG. 2 is a table showing the dimensions of the bottoms of various material containers having ridges proximate their bottoms.

FIG. 3 is a table showing the dimensions of the bottoms of various material containers having ridges proximate their bottoms.

FIG. 4 is a table showing the dimensions of the bottoms of various material containers having smooth sides proximate their bottoms.

FIG. 11 is a cut-away exploded perspective view of one embodiment of the invention used with a commercial conventional material container and having an elasticized adhering element as a joining element and a circular cross-section.

DETAILED DESCRIPTION OF SOME EMBODIMENTS OF THE INVENTION

Figure 5:
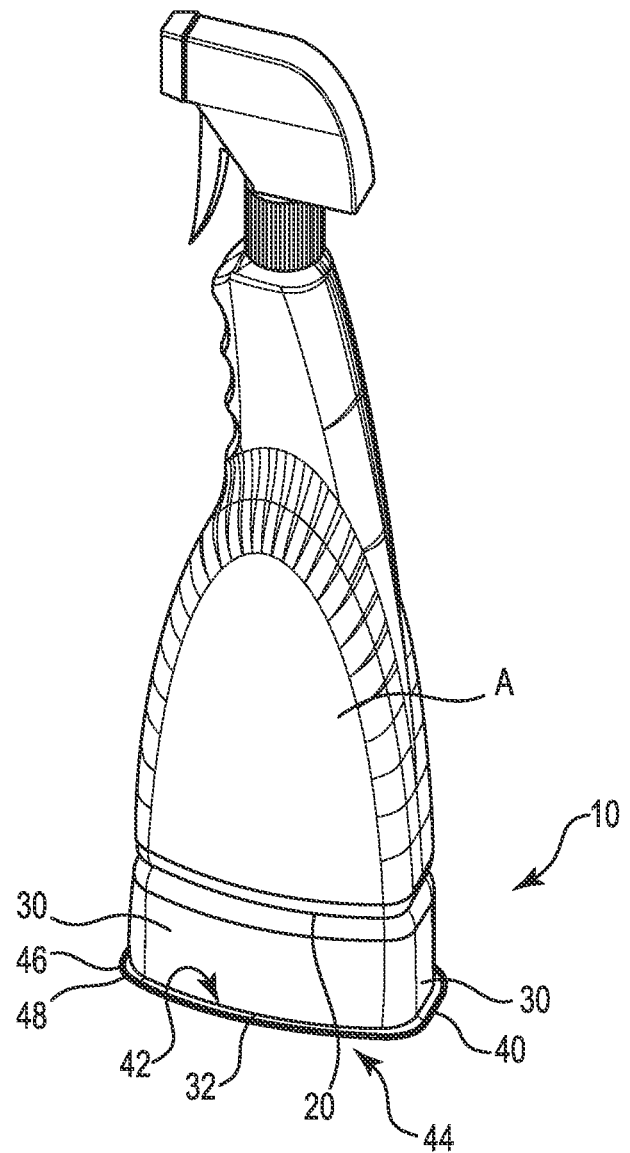
FIG. 5 is a perspective view from the upper right of an embodiment of the invention attached to a spray head dispensing material container product.

There is an ongoing desire in society for more convenience. This is particularly true when people want to perform tasks involving materials in containers. Generally, these tasks require additional accessories that are often stored elsewhere and are difficult to locate. Frequently, people are driven to buy new accessories because they cannot find the ones that they previously purchased.

I have invented an apparatus and a method of using the apparatus to solve this problem. My apparatus is a storage container apparatus that has a top dimension that is approximately similar in cross-section to the bottom of the material container. The storage container apparatus attaches to that bottom and has a base that releasably connects to the sides of the storage container. In some embodiments, the base extends outward from the connection point to provide additional standing stability of the joined combination. At least one accessory generally associated with tasks involving the material may be placed into the apparatus before it is releasably attached to an individually obtained material container. Alternatively, this apparatus may already contain at least one such accessory.

There are numerous teachings of material containers with detachable bases that are able to contain accessories or come with them. However, none of them are just a base apparatus designed to attach to at least two commercially available material containers from at least two different products that are sold separately and designed to detachably attach to these series of material containers.

Currently material containers with detachable bases that can hold various items are known. U.S. 2006/0102585 is a representative reference that teaches a reusable water bottle that contains a detachable base member that can be used to hold change, car keys, or other personal objects of the user's choice. The container is altered with a screw thread to match the screw thread on the top of the inside of the base. U.S. 2006/0186144 teaches a dip-tube style spray bottle with a conical bottom, detachable screw-on base, and no accessory. These containers are not designed to be sold separately from the storage bases and require a joining element that matches with the storage base.

Material containers with detachable bases that contain specific accessories useful in the use of the material are also known. Representative references include, for example, the following. U.S. Pat. No. 6,431,405 teaches a combined fluid container and pop-up sheet product dispensing system within a detachable base that snaps onto the bottom of the container. The fluid container is specially modified to detachably fit the base and is not designed to be available apart from the base. U.S. Pat. No. 6,321,937 teaches an aerosol dispensing system with an aerosol container having a bottom designed to snap-fit onto a detachable base that is designed to be a wipe dispenser when removed from the container. U.S. Pat. No. 1,942,953 teaches a fluid container with a beaded base designed to friction-fit within the larger beaded opening of a base having accessories such as wipes and a removable base cap to access the accessories. This is taught and designed to be sold as a unit. U.S. Pat. No. 1,903,312 teaches a corn cure package comprising a fluid container adapted to affix by various methods to a similarly adapted detachable base containing pads for the treatment of a corn. This is taught and designed to be sold as a unit. U.S. Pat. No. 7,585,125 teaches a fluid container with a modified bottom releasably attached to a modified opening of a base that contains cloth wipes. This is taught and designed to be sold as a unit.

Similar references teach detachable systems that are also designed to be sold together to address a convenience need for a user. Representative references include, for example, the following. U.S. Pat. No. 7,303,347 teaches a stain removing kit comprising a container of fluid with an applicator in the fluid attached to the cap, and a base releasably attached to the bottom of the container and enclosing a soft absorbent material pad or sponge. U.S. Pat. No. 4,795,028 teaches a primary container and a base container where each are modified with opposing ribs to permit the inside top of the base to snap onto the outside bottom of the container and a handle on the outside of the top of the base to facilitate separation of the base from the container. The base can hold companion accessories. U.S. Pat. No. 5,531,353 teaches a drinking container with a detachable base where the bottom of the container has a circular concave region designed to snap-on to the ridge inside the top of the base. A container top can be used as a support under the base for further stability. U.S. Pat. No. 5,165,546 teaches a pharmaceutical container with detachable base to hold drug information where both container and base are modified with a groove and flange to achieve a snap-fit. U.S. Pat. No. 4,054,220 teaches a pocket sized flask container for cleaning dentures comprising an upper container for fluid, a lower container fixed to the upper container and open at the bottom for receiving a denture, and a base that releasably fits over the lower container to seal the lower compartment hole so as to retain cleaning fluid. The base is also used to transfer fluid from the upper chamber to the lower chamber. The base surrounds the lower part of a container so that the outside of the base is flush with the outside of the upper part of the flask container and both have retention bosses and apertures to cause the detachable snap-fit. U.S. Pat. No. 378,752 teaches a bottle with a top compartment and a bottom compartment, both having screwable caps at each end to access the individual compartments. U.S. Pat. No. 6,945,416 teaches a valuable storing apparatus comprising a cylindrical sleeve for holding valuables and two bottles releasably friction-fitted within each end up to internal stops to form the appearance of one taller bottle. U.S. 2004/0182886 teaches cleaning apparatus comprising an aerosol cleaning fluid container surrounded by a releasably attached lint roller frame covered by a tacky adhesive surface to retrieve lint. Each are designed and taught to be sold as a unit comprising the container and the base with the container and the base being modified to releasably attach to each other.

Material containers with detachable bases also include proprietary fluid container assemblies with detachable bases that permit the dispensing of off-the-shelf paper towels. Representative references are as follows. U.S. Pat. No. 6,644,563 teaches a combined portable, cleaning fluid spray apparatus and paper towel support and dispensing apparatus. U.S. Pat. No. 7,743,947 teaches a cleaning tool. U.S. Pat. No. 6,216,920 teaches a combined spray bottle and paper towel holder. U.S. Pat. No. 6,138,874 teaches a dispenser for fluids and paper towels. U.S. Pat. No. 5,819,989 teaches a combined liquid and paper towel dispenser. U.S. Pat. No. 5,671,872 teaches a liquid container and paper towel holder. All of these teach a unique assembly including a material container that is substantially smaller than conventional stand-alone cleaning fluid containers and a detachable base that I have invented.

Material containers with detachable bases also include spray bottles in combination with other accessories. Represent references are as follows. U.S. 2008/0049415 teaches a stain and odor detection and cleaning system without a detachable base that comprises a battery-powered black light source affixed to the side of a cleaning fluid container to detect stains and urine. U.S. 2005/0133538 teaches a spray container configured to have an accessory holder that is releasably attached to the side of the container. U.S. Pat. No. 6,082,595 teaches a detergent dispenser container with a window wiper slideably mounted to the side of the container with no base. U.S. Pat. No. 4,273,459 teaches a cleaning system comprising a liquid dispensing bottle with a squeegee device affixed to the dispensing head of the container. All of these teach a unique assembly including a material container and either an accessory or a detachable compartment in locations other than the bottom of the container.

All of the above are designed and taught to be sold as a unit comprising the material container and the storage base. In each case, both the container and the base are modified to releasably attach to each other. No teaching or suggestion is made that the container is to be sold separately from the releasable base or that the releasable base is to be attached to other containers of similar design even if they contain the same branded product sold in material containers without releasable bases. Certainly, no teaching or suggestion is made for the storage base to be releasably attached to material containers of different products under the same brand or of different products under different brands. For the purpose of this document, "differently branded products" means different products under the same brand. See FIGS. 1 to 4 for examples of differently branded products with similar bottom dimensions.

Material containers come in a variety of containers with different shapes and sizes. An increasing number containing different products or brands are standardizing some of those shapes to accommodate store shelf considerations. Many of the material containers that are made of plastic are also made with a ridge also the outside of the bottom of the container that augments stability of the material container and decreases the likelihood of the material container tipping over. FIG. 1 through FIG. 3 are tables showing examples of these material containers. As seen, differently branded material containers or those that contain different products often come in similar shapes proximate their bottoms with similarly shaped ridges.

Other material containers have smooth substantially flat sidewalls with little or no protrusions proximate the bottom. These material containers may be made of a variety of materials such as, for example, plastic, metal, or glass. They generally come in standardized sizes. FIG. 4 is a table showing examples of these material containers. As seen, differently branded material containers or those that contain different products often come in similar shapes proximate their bottoms with smooth sides.

I have invented an attachable storage container able to be connected with the bottom of one of at least two conventional material containers containing commercial materials. The storage container apparatus comprises at least three elements, sides, a base, and a joining element. The first element, the sides, has a substantially vertical surface, an outer top edge that is within 0.25 inches of the sides proximate the bottom of a commercial material container, and a contour that extends downward and ends in an edge with a first attachment element.

The second element, the base, has a top, a bottom, and an edge, the top having a second attachment element that detachably attaches to the first attachment element of the sides and the edge extends outward from the attachment element at least 0.13 inches. In some embodiments, the edge extends outward at least 0.25 inches. In some embodiments, the edge extends outward at least 0.5 inches. Generally the edge extends outward from the lowest point of the base. The extension increases the standing stability of the storage container when it is connected to the bottom of the material container. In some embodiments, the base and the sides are attached at one place by a hinge. This prevents the base from being completely detached from the container and possibly misplaced.

The attachment element is able to detachably attach the base to the sides. As an example, the attachment element in one embodiment is a groove channel proximate the edge that is able to detachably attach to an edge of the side that may have a bead on the edge or an edge with an outwardly tapered slope to facilitate attachment in a tongue and groove or snap-fit manner. As another example, the attachment element in one embodiment is a somewhat vertical inwardly slanting wall that fits in a friction fit manner into the inside of the side edges and may be stepped for easier attachment. In another example, the attachment element in one embodiment a ridge having a circular cross-section and threads on the outward side of a ridge with matching threads on the lower inward side of the sides.

The third element, the joining element, is configured to affix the storage compartment proximate to the bottom of a commercial material container. Joining elements come in two aspects, one with a storage container apparatus further comprising a top with adhering elements on its top surface and another with a storage container apparatus having sides with adhering elements part of or attached to the top regions of the sides.

In some embodiments, one or more openings penetrate the base apparatus. The openings may be of any shape such as, for example, slits, polyhedrons, circles, or ovals. The penetrations function to air out the base in use. Thus, damp accessories may be placed in the base after use, such as, for example, wipes. Penetrations are not desirable in embodiments that may be used in wet environments and use accessories that are desired to be dry until use.

The commercially available material containers have various shapes and contents as long as each is independently available to a user. Some material containers may contain solids such as, for example, coffee. Other material containers may contain fluid ranging from pourable to paste consistency. In addition, the horizontal periphery of the sides of the material containers may have any shape including, for example, the shape of a circle, oval, square, rectangle, or polygon.

In the first aspect, the storage container apparatus further comprising a top with adhering elements on its top surface. The top is an element with a substantially horizontal top surface and an outer edge that is joined to the outer top edge of the sides of the storage compartment and an adhering element is configured to affix to the top surface of the top of the storage compartment and to the bottom of the commercial material container. Adhering elements for this aspect are known to the art and include, for example, double-coated adhesive tapes double-coated adhesive foam tapes and adhesive-backed mechanical fasteners such as, for example a hook and loop fastener such as VELCRO®. Some are designed to not be easily removed from surfaces to which they are adhered. Some are designed to join two surfaces in an unreleasable manner. Some are designed to join two surfaces in a releasable manner. The joining element may include various numbers of strips, pads, or patches In the second aspect the storage container apparatus has sides with an adhering element proximate the top edge of the sides and the adhering element is configured to affix to the bottom of the commercial material container.

The adhering elements of the second aspect are designed to releasably attach the base proximate the bottom of the independently obtained material container. Three adhering elements will be discussed here. It is understood that other adhering elements are included in my invention as long as they enable the releasable attachment of the base to at least two differently branded material containers that are available independently to users and that are not intended to be attached to a base. The storage container apparatus is generally made of plastic but may be made of other materials as discussed below depending on the adhering element used.

One adhering element is an elasticized side comprising an adhering element at least along the top of the sides of the storage container apparatus that allow the top of the sides to stretch around the ridge of some commercial material containers above discussed and cling to the commercial material container with compressive force. The material of this storage container apparatus is generally plastic such as, for example, polyurethane and is flexible enough to facilitate a releasable attachment. This adhering element requires that the inside periphery of the top of the sides be between the dimensions of the periphery of the container proximate its bottom and the raised edge of the container.

Another adhering element is a high friction surface on the inside of the top of the sides of the storage container apparatus. This surface provides a friction fit of the base to a material container having a similar horizontal periphery. Suitable materials are those that are pliable and increase the surface contact between the inside storage container apparatus and the outside material container to decrease sidewise slippage without exertion of a user. Some materials that can cause such a friction fit to commercial containers made of plastic, metal or glass include, for example, rubbers, plastisols, and thermoplastic elastomers as discussed later. The material of this storage container apparatus is generally plastic or sheet metal as long as the inside top surface of the sides meets the above requirements and may be slightly flexible to facilitate a releasable adherence either inherently or by means of alternation such as by application of a selected coating. This adhering element requires that the inside periphery of the top of the base be substantially the same as the dimension of the periphery of the container proximate its bottom.

Still another adhering element is one that releasably attaches the outside of the top of the sides with the outside of the material container proximate its bottom. This adhering element is a plurality of mechanical fastener paired strips where at least the first strip of the pair is adhesive-backed and the second may or may not be adhesive-backed. The first adhesive-backed strip is divided into two pieces; each adhered to the outside of the base and the outside of the material container at appropriate locations to be proximate to each other when the base is in an adhering position with the material container. The second strip is undivided and mates with both halves of the adhesive-backed sections. The second strip is removed at least from one half of the first adhesive-backed strip when the storage container apparatus is to be detached from the material container. In some embodiments, the adhesive-backed piece adhered to the material container may be removed to reapply onto another material container with a similar horizontal periphery. In some embodiments, additional adhesive-backed strips may be provided with or without their matching strip. Mechanical fasteners are well known and include, for example, VELCRO® fasteners. The material of this base apparatus is generally plastic, sheet metal, or glass as long as the horizontal periphery approximates the outer surface of the material container. This adhering element requires that the inside periphery of the top of the base be at least similar to or larger than the dimension of the periphery of the container proximate its bottom. Some embodiments have a diameter within 0.5 inches. Some embodiments are rectangular in overall shape with sides that are within 0.25 inch of each side of the horizontal base of the commercial material container. Some embodiments have a diameter or a horizontal cross-section that is substantially the same.

This invention does not include a snap-lock adhering element. One aspect of the snap-lock adhering element is a recess along the inside of the top of the sides of the top of the sides that substantially matches the ridge of some commercial material containers above discussed. Another aspect of the snap-lock adhering element is the reverse where the material container has a recess proximate to its bottom and the adhering element would be a mating ridge. Material containers able to interact with the snap-lock adhering element are generally made to be able to releasably attach to something else with a mating attachment element. The invention of this application is intended to releasably attach to commercial material containers that are not designed to attach to something else.

Some embodiments may have bottoms that are modified to perform additional tasks. Some embodiments have scrubbing surfaces such as, for example, built-in plastic or rubber bristle molding on the outside bottom for large area scrubbing. Some embodiments have scrubbing surfaces on the outside corners of the base for spot cleaning. Some embodiments have double-sided adhesively-backed mechanical fasteners adhesively adhered to the outer surface of the bottom and able to be adhered to scrubbing and cleaning pads such as, for example, SCOTCH BRITE® by 3M Company of Maplewood, Minn. Some embodiments hold the scrubbing pad to the bottom with double-coated adhesive tape with each side of a different tackiness so that one side is repositionable.

Various numbers of mechanical strip pairs may be used. Typically, when mechanical fastener strips are used, more than one pair are used equally spaced about the circumference of the top of the base if used in a vertical manner. One long pair of matching strips may be used when the strips are used in a horizontal manner and each strip has a width sufficient to obtain a secure attachment of the base to the container. Some embodiments use strips with a width of at least 1 inch. Some embodiments use strips with a width of at least 1.5 inches. Some embodiments use strips with a width of at least at least 2 inches. In each case, the adhesive-backed strip is cut lengthwise with one section attached to the outside of the base proximate its top and the other attached to the container proximate its bottom. The matching strip is then used to releasably attach the base to the container. Shapes other than strips may be used as long as one adhesive-backed surface has two sections to adhere to the base and container, and a mating fastener surface to securely bridge the two sections.

The commercially available material containers have various shapes and contents as long as it is independently available to a user. Some material containers may contain solids such as, for example, coffee. Other material containers may contain fluid ranging from pourable to paste consistency. In addition, the bottom the material containers may any shape including, for example, the shape of a circle, oval, square, rectangle, or polygon.

Some embodiments may have bases that are modified to perform additional tasks. Some embodiments have scrubbing surfaces such as, for example, built-in plastic or rubber bristle molding on the outside of the base for large area scrubbing. Some embodiments have scrubbing surfaces on the outside corners of the base for spot cleaning. Some embodiments have double-sided adhesively-backed mechanical fasteners adhesively adhered to the outer surface of the bottom and able to be adhered to scrubbing and cleaning pads such as, for example, SCOTCH BRITE® by 3M Company of Maplewood, Minn. Some embodiments hold the scrubbing pad to the bottom with double-coated adhesive tape with each side of a different tackiness so that one side is repositionable or with both sides having similar tackiness.

The storage container apparatus may further comprise at least one accessory stored within the storage container apparatus and useful in the use of the material. The accessories are as varied as the branded material to which the base is to be associated. Some embodiments include at least one accessory from a group consisting of a funnel for use in dispensing fluid concentrate and dilution fluid in to the container, at least one reusable wipe element for smoothly spreading dispensed fluid onto a surface, and a concentrate for making the fluid when dissolved in dilution fluid. Some embodiments include at least one of the accessories from a group consisting of an abrasive smoothing material for obtaining smooth finishes and an abrasive material for cleaning surfaces. Some embodiments include at least one of the accessories from a group consisting of a collection of disposable wipe elements. Some embodiments include an opening adaptable to the withdrawal of an accessory such as a wipe from the collection of disposable wipes. Some embodiments include at least one accessory that is a collection of detachable disposable wipe sheets. Some embodiments include accessories associated with the preparation of coffee. Some embodiments include accessories that are devices such as a snake for cleaning drains, paint can key openers, or removable pouring spouts. The list is endless as long as the storage container apparatus is configured as described above to releasably attach to at least two differently branded material containers that are separately available to a user.

Figures five to ten further describe some embodiments of the first aspect of my invention. The same numbers are used to designate the same elements. FIG. 5 is a perspective view from the upper right of an embodiment of the invention attached to a spray head dispensing container product. Commercially available material container (A) is shown attached to a storage container apparatus (10) by its top (20) adhering to the bottom of material container A. A commercial material container and storage container apparatus having substantially similarly-dimensioned substantially rectangular attachment surfaces is shown but other contours such as, for example, circular oval and square may be used as described above. Compartment sides (30) are attached to a compartment base (40) with a friction fit attachment set of elements comprising side edge (32) surrounded by the matching ridge of the container base (not shown). The top of the compartment base (not shown) is inside storage container apparatus 10 and the bottom of the compartment base (not shown) is outside storage container apparatus 10. A small lip or flange (48) extends outward from the lowest point of the bottom of the compartment base.

Figure 6:
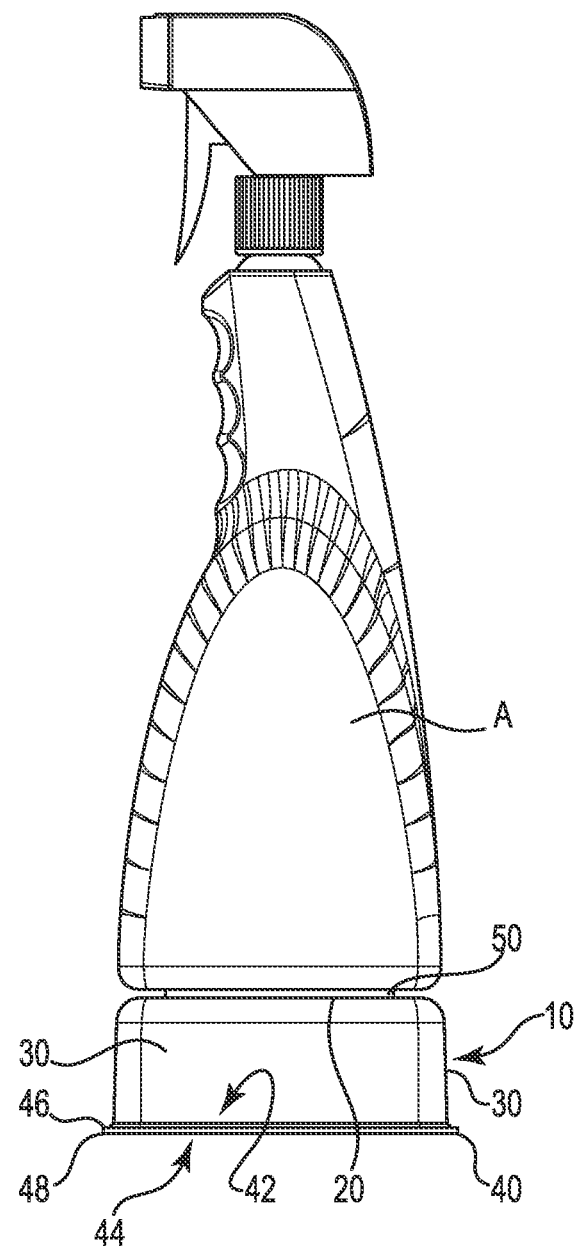
FIG. 6 is a front view of the embodiment of FIG. 5.

FIG. 6 is a front view of the embodiment of FIG. 5. The elements are the same as discussed above. Lip 46 is more clearly seen. Also seen is the space showing a joining element (50) that was not clearly seen in FIG. 5.

Figure 7:
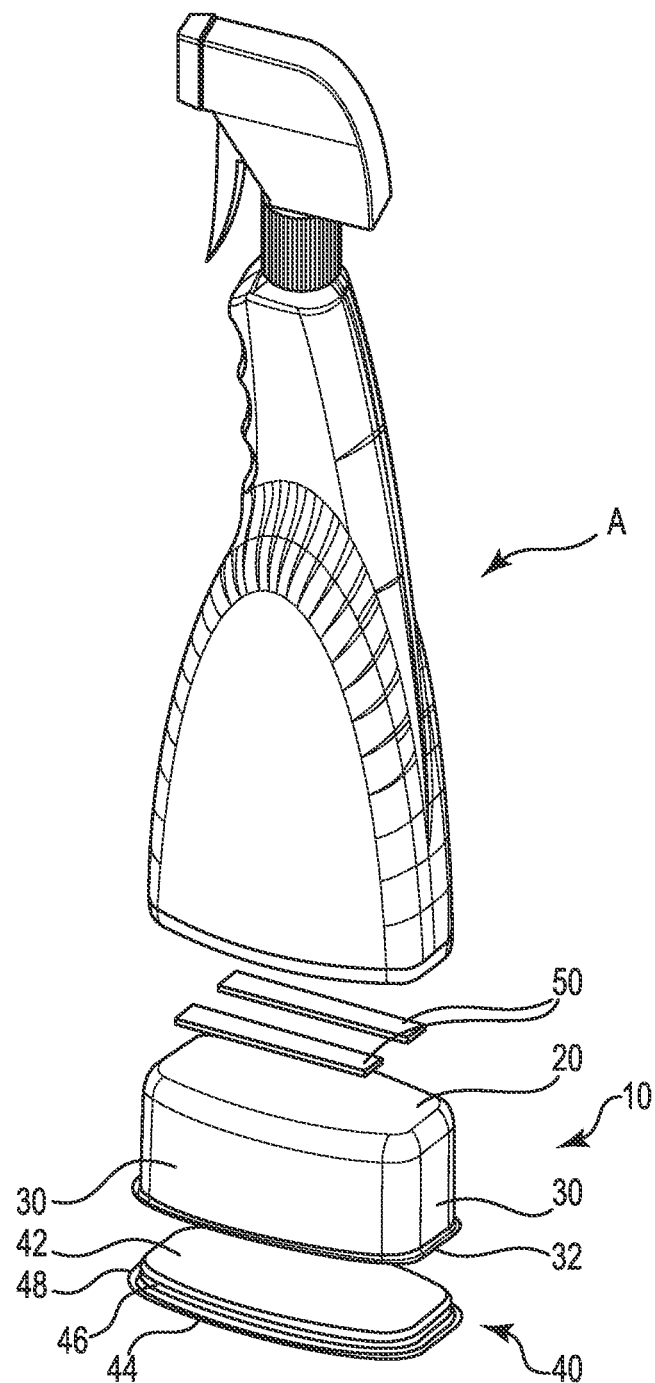
FIG. 7 is an exploded perspective view from the upper right of the embodiment of FIG. 5.

FIG. 7 is an exploded perspective view from the upper right of the embodiment of FIG. 5. Here joining element 50 is clearly seen. Also clearly seen is the detachably attachable element set shown as a friction fit set. The first detachably attachable element is on the compartment side that is near edge 32. A second detachably attachable element (46) is on compartment base 40.

Figure 8:
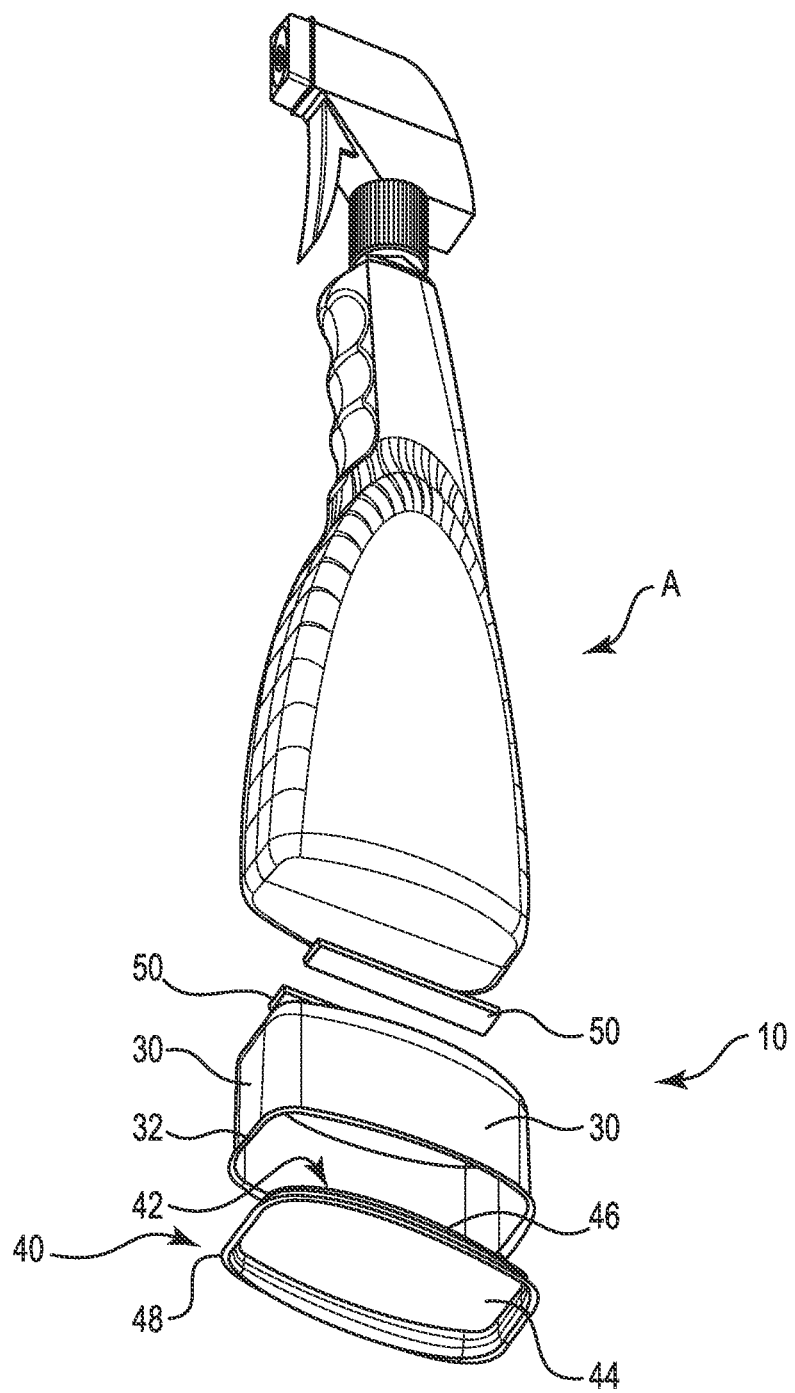
FIG. 8 is an exploded perspective view from the lower left of the embodiment of FIG. 5.

FIG. 8 is an exploded perspective view from the lower left of the embodiment of FIG. 5. This perspective more clearly shows how second attachment element 46 fits into the first attachment element near edge 32.

Figure 9:
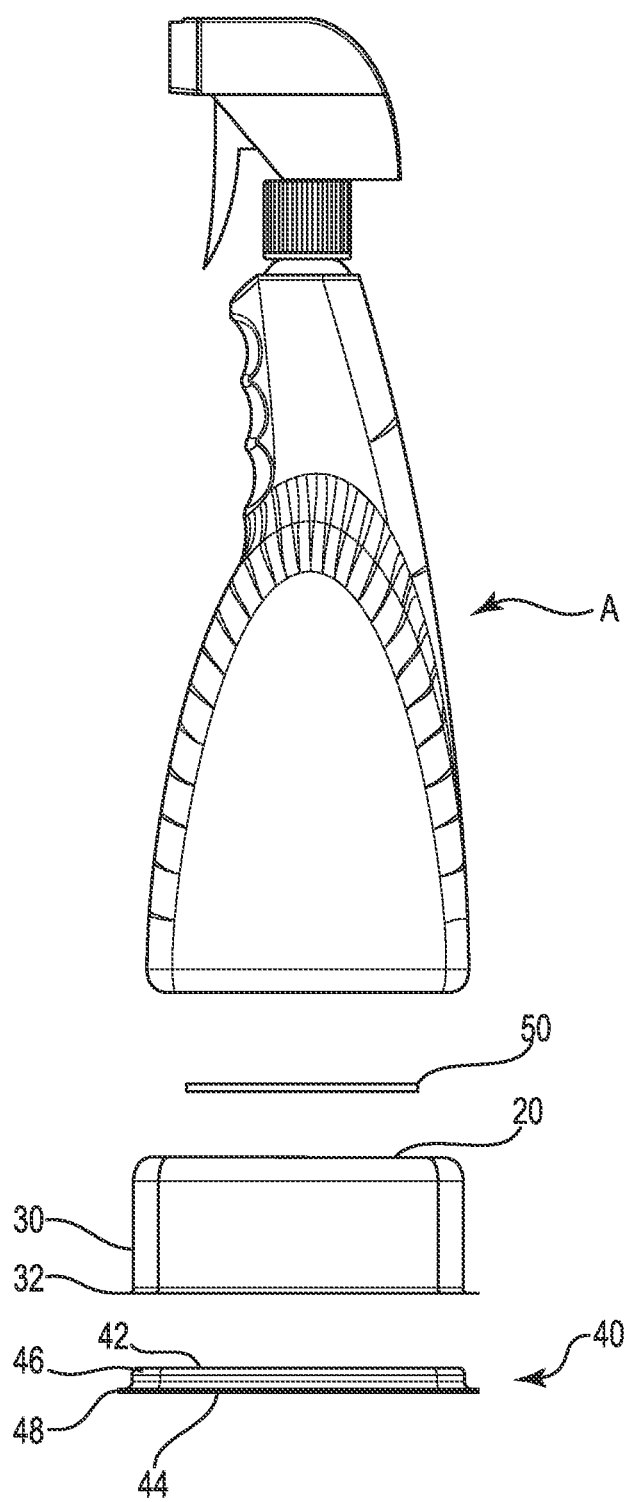
FIG. 9 is an exploded side view of the embodiment of FIG. 5.

FIG. 9 is an exploded side view of the embodiment of FIG. 5. This combined with FIGS. 5-8 clearly show the configuration of this embodiment of the invention.

Figure 10:
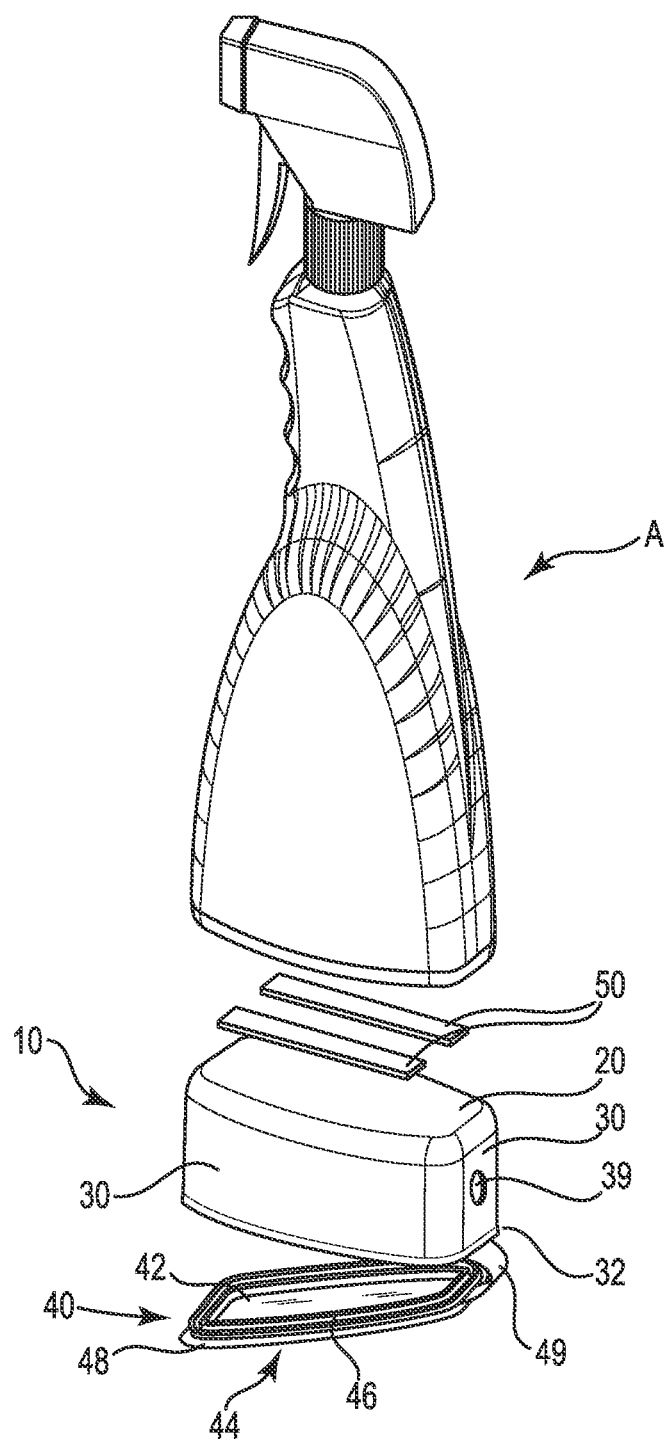
FIG. 10 is an exploded perspective view from the upper right of an embodiment of the invention with a spray head dispensing material container.

FIG. 10 is an exploded perspective view from the upper right of another embodiment. Similar elements are shown here as above except a different detachably attachment element set is shown. The attaching elements that form a snap fit arrangement are shown as an outwardly sloped first attachment element 32 positioned to snap fit into second attachment element 46, a channel rising from the top of bottom 42 of base 40. Also, a more extended lip 48 is illustrated. In addition, a perforation or hole (39) is depicted that is useful in allowing accessories such as paper towels to be removed from storage container apparatus 10 without detaching compartment base 40 from compartment sides 30. Compartment side 30 and compartment base 40 are attached with a hinge (49).

Figures eleven to fourteen further describe some embodiments of the second aspect of my invention. FIG. 11 is a cut-away exploded perspective view of one embodiment of the invention used with a commercial conventional material container, and having an elasticized adhering element as a joining element and a circular cross-section. The storage container apparatus 10 comprises a side 30 and a joining element that comprises a top substantially vertical edge (34) and an adhering element (36) that is able to elastically stretch around the ridge of material container B and contract around the surface above the ridge to detachably attach storage container apparatus 10 to material container B. Compartment side 30 also has a bottom edge 32 that is a first attachment element. In this embodiment compartment base 40 has a top 42, bottom 44 and a second attachment element 44 that is recessed with a groove extending downward but opening upward that snaps onto the first attachment element 32 of the side. Compartment base 40 also has a lip 48 that extends horizontally from the bottom of the grooves at the end of the base. In some embodiments the entire compartment is made of the elasticized material of adhering element 36. Storage container apparatus 10 releasably is joined to material container B when the top of the sides of the storage container apparatus B is pushed against the bottom of the container such that the adhering element stretches to fit about the bottom ridge of the material container B and relaxes to fit about the side of material container B above the ridge. In some embodiments, the joining is not releasable such as, for example, when the material container is reused. In some embodiments the joining is also detachable such as, for example, when the storage container apparatus is to be used on other material containers when the present one is empty. Storage container B is opened when compartment base 40 is detached from the compartment side 30 of the storage container B so that items may be placed into or out of the storage container apparatus. Alternative items can be placed into or out of the storage container apparatus by removing the storage container apparatus from the material container B as described above.

Figure 12:
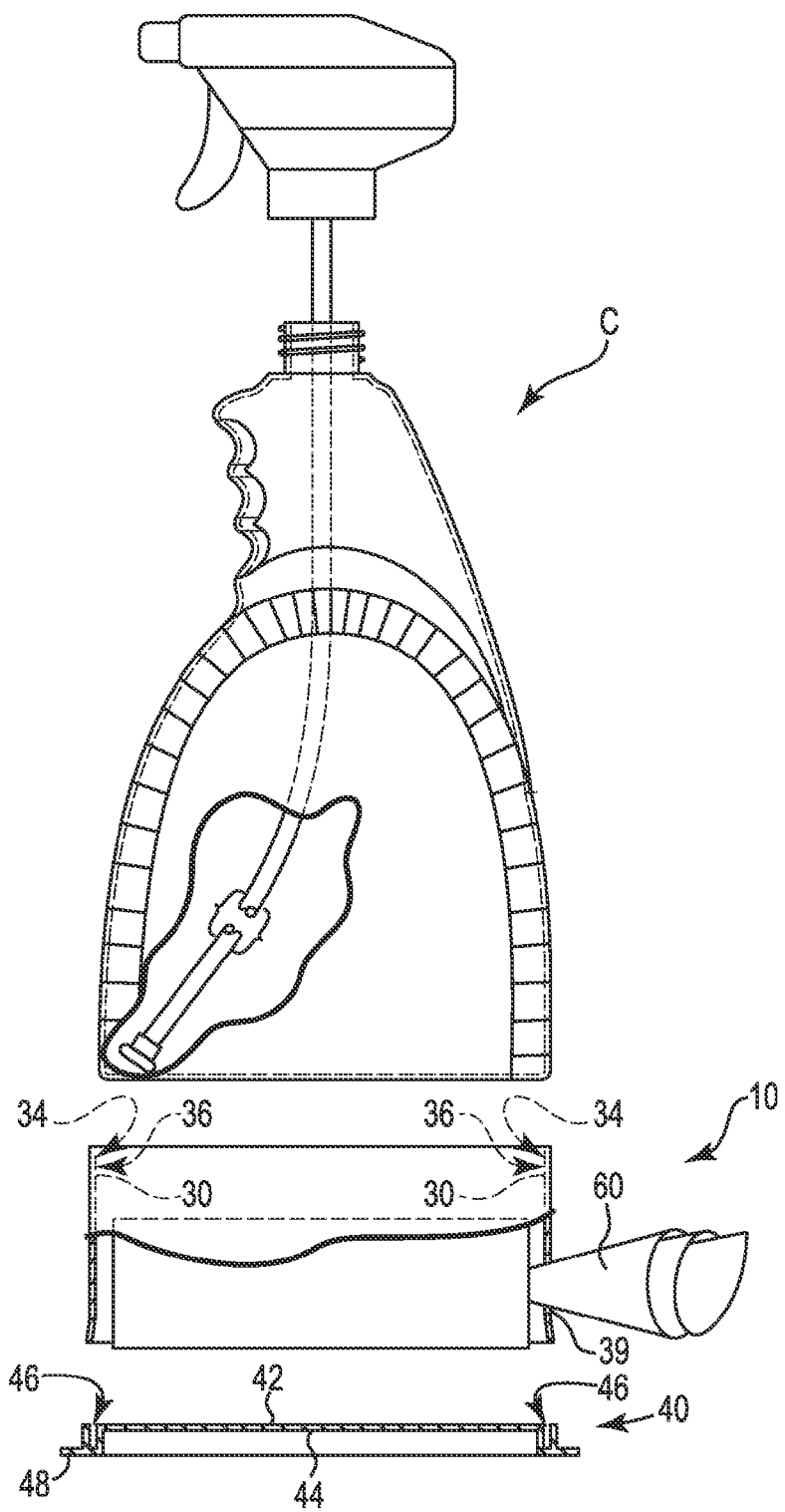
FIG. 12 is a cut-away exploded perspective view of one embodiment of the invention used with a material container, and having a collection of disposable wipes accessory, a rectangular cross-section, and a friction fit adhering element as a joining element.

FIG. 12 is a cut-away exploded perspective view of one embodiment of the invention used with a material container, and having a collection of disposable wipes accessory, a rectangular cross-section, and a friction fit adhering element as a joining element. The material container (C) has a smooth side with no ridge extending outward from its bottom and a rectangular horizontal cross-section proximate its bottom. In this embodiment, the joining element is the adhering element 36. It is a material on the inside top 34 that is able to intimately contact the outside surface of container C proximate its base when pressed together to obtain a reversible friction attachment. Also, the storage container apparatus base 44 is recessed above the grooved second attachment element 46 and extended lip 48 extends outward from the bottom of grooved second attachment element 46. Storage container apparatus 10 has accessory 50, a collection of disposable wipes. Container side 30 has opening 39 through which individual wipes may be pulled until they disconnect from the collection.

Figure 13:
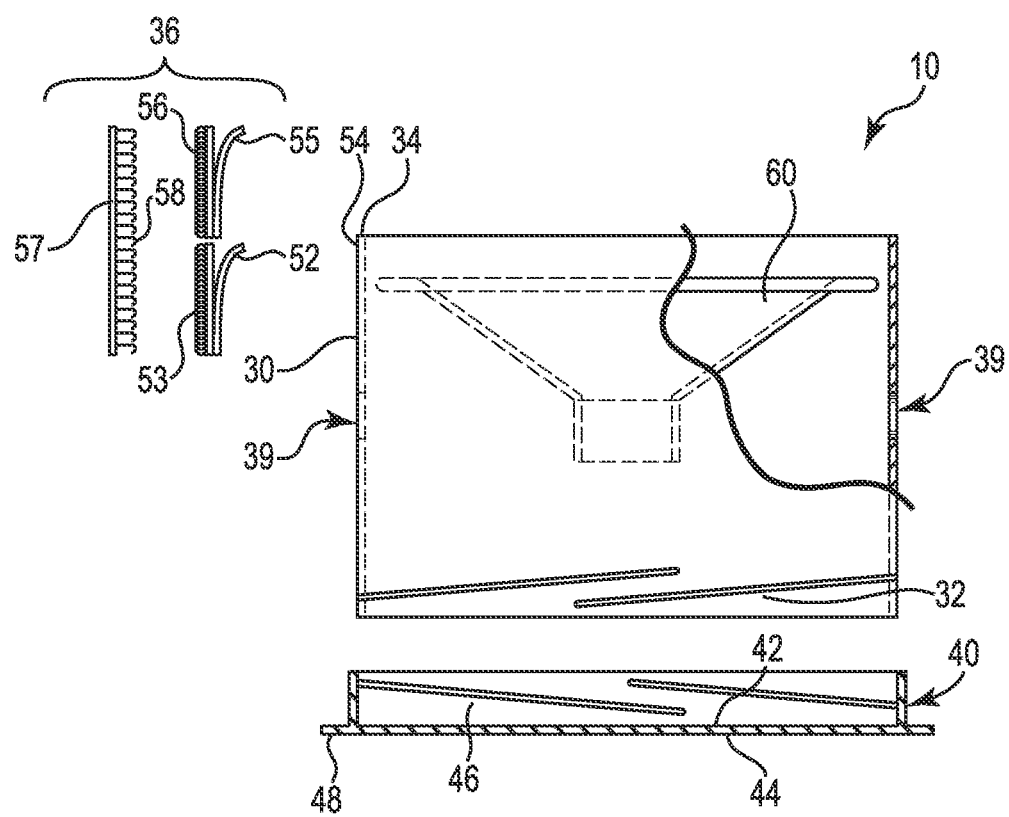
FIG. 13 is a cut-away view of one embodiment of the invention with a mechanical fastener adhering element as a joining element and a funnel accessory.

FIG. 13 is a cut-away view of one embodiment of the invention with a mechanical fastener adhering element as a joining element and a funnel accessory. This figure shows storage container apparatus 10 with the joining element comprising top side edge 34 and adhering element 36, and an adhesive backed mechanical fastener element ready to be attached to the outside of the base and another container (not shown). A release liner (52) over a separate lower half (53) of an adhesive-backed strip of the mechanical fastener, the loop side in this embodiment, is shown partly removed prior to the adhesive surface being pressed onto the outside (54) of the top of storage container apparatus 10. Similarly, a release liner (55) over the separate upper half (56) of adhesive-backed strip of the mechanical fastener, the loop side, is shown partly removed prior to the adhesive surface being pressed onto the outside proximate to the bottom of container (not shown). The mating strip of the mechanical fastener (57), the hook side (58) in this embodiment, with both halves of the strip connected is shown waiting to be pressed onto the first two sections when storage container apparatus 10 is proximate the bottom of the container. Proximate may mean, for example, contacting in some embodiments and encompassing in other embodiments. Additional mechanical fastener strip pairs are not shown but are places strategically around the circumference of the top of the base. Also, the base 44 is attached to the second attachment element 46 that is a raised surface with threads on the outer surface. The second attachment element 46 is a set of matching threads on the outside surface that protrudes upward from the top of the bottom 42 of base 40. Lip 48 extends outward from bottom 44. A few threads are shown but may be of any number. Storage container apparatus 10 has lip 48 extending horizontally outward from bottom 20. Accessory 60 is the funnel. Openings 39 are circular and through opposite regions of side 30 for, as an example, aeration.

Figure 14:
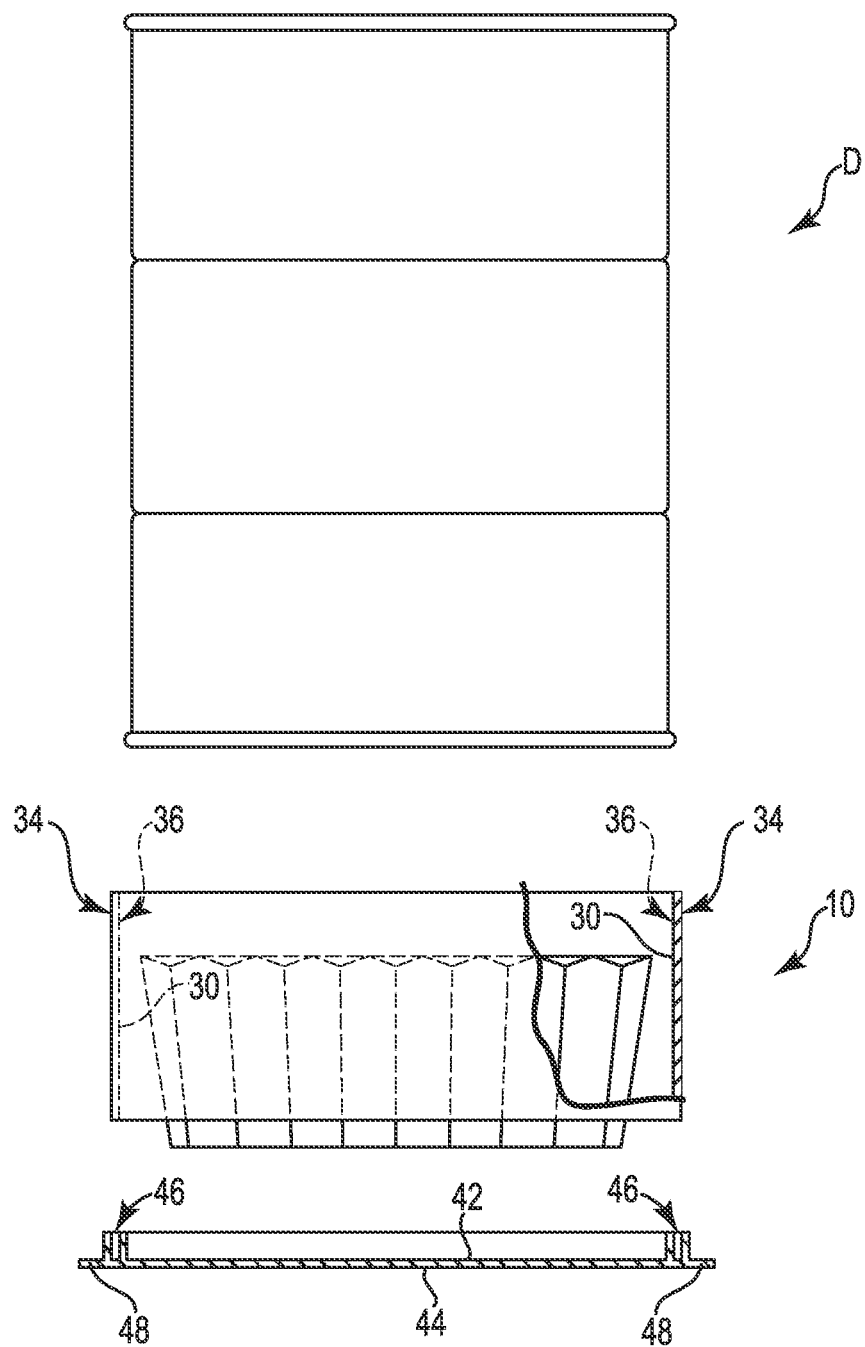
FIG. 14 is a cut-away exploded perspective view of one embodiment of the invention used with commercial conventional solid material container and having a friction fit adhering element as a joining element and a circular cross-section.

FIG. 14 is a cut-away exploded perspective view of one embodiment of the invention used with a commercial conventional solid material container and having a friction fit adhering element as a joining element and a circular cross-section. This is a combination of circular cross-sectioned FIG. 11 and friction attached FIG. 12. The material container D is a circular cross-sectioned coffee can with granular coffee inside. In this embodiment, the joining element comprises top edge 34 and surface element 36, a material on the inside top of side 30 that is able to intimately contact the outside surface of container D proximate its base when pressed together to obtain a reversible friction attachment. Also, the base's bottom 44 is level with lowest point of base 40, the grooved second attachment element 46 extending above the top 42 of the base, and the extended edge 48 extending from the bottom of the base. Storage container apparatus 10 contains at least one accessory associated with the preparation of coffee, a collection of filters.

The storage container apparatus, except for some of the joining elements involving separate adhering strips that can be purchased separately, can be made from a variety of methods known to the art. Three are discussed below but are meant to be non-exclusive examples. A first manufacturing method is thermoforming. Material may be PET, rigid PVC, PE, or another thermoformable resin in sheet form. These materials are relatively slippery and hard.

A second manufacturing method is blow molding. This is the same technology used to mold virtually all spray bottles. Material may be PET, rigid PVC, PE, or other blow moldable resin. These materials are relatively slippery and hard. The storage container top and side may be molded individually or with two conjoined, identical mirrored parts that would require separation after molding.

A third manufacturing method is injection molding. Material used with this method can be virtually any injection moldable resin. Rigid resins such as, for example, ABS, rigid PVC, polystyrene (PS), PET, polypropylene (PP) could be molded into the storage container apparatus.

We have also invented a method of using a storage container apparatus able to be connected at its top to a bottom of one of at least two conventional material containers. The method comprises three steps. The first step is providing a commercial material container with material that ranges from solid to liquid to gas. The second step is providing the above storage container apparatus in its broadest sense. The third step is engaging the joining element to attach the top of the storage container apparatus proximate to the bottom of the conventional commercial material container.

Some embodiments of the method may comprise a storage container apparatus that contains various additional elements. These embodiments may further comprise a fourth step of using the accessories. Some of these embodiments may further comprise a fifth step of placing the accessories back into the storage container apparatus upon completion of use. In some embodiments, the commercial material container is a commercial fluid container and the commercial material is a commercial fluid that ranges from pourable liquid to spreadable paste. In some embodiments, the method further comprises a sixth step, the step of placing in the storage container apparatus at least one accessory that is useful in the use of the material in the commercial material container. In some embodiments comprise a seventh step, the step of detachably attaching an accessory to the outside of the base of the storage container apparatus. The method aspect of the invention may also include the provision of additional elements to the storage container apparatus and additional steps of use according to the above teachings.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. An attachable storage container able to be connected with the bottom of one of at least two materials, commercial material containers containing commercial material that ranges from solid to liquid to gas comprising:
   a. a compartment, comprising:
      i. sides having a substantially vertical surface, an outer top edge that is within 0.25 inches of the sides proximate the bottom of the commercial material container, and a contour that extends downward and ends in an edge with a first attachment element, and
      ii. a base with a top, a bottom, and an edge, the top having a second attachment element that detachably attaches to the first attachment element of the sides and the edge extends outward from the second attachment element at least 0.13 inches; and
   b. a joining element that is configured to affix the storage compartment proximate to the bottom of a commercial material container.

2. The storage container apparatus of claim 1 wherein the joining element is releasable.

3. The storage container apparatus of claim 1 wherein the joining element, comprises,
   a top having a substantially horizontal top surface and an outer edge that is joined to the outer top edge of the sides of the storage compartment and
   an adhering element that is configured to affix the top surface of the top of the storage compartment to the bottom of the commercial material container.

4. The storage container apparatus of claim 3 wherein the adhering element is from a group consisting of double-coated adhesive tape, double-coated adhesive foam tape, and adhesive-backed mechanical fasteners.

5. The storage container apparatus of claim 1 wherein the joining element, comprises,
   the side having an adhering element proximate its top edge and configured to affix proximate to the bottom of the commercial material container.

6. The storage container apparatus of claim 5 wherein the adhering element is from a group consisting of elasticized material able to stretch over and compression fit above corresponding smooth ridges on the lower sides of the commercial material containers and a pliable material able to friction attach to the outside surface of the lower sides of commercial containers.

7. The storage container apparatus of claim 1 wherein the sides have an outside top surface, at least one joining element is affixed to the outside surface, a matching joining element is adhesively attached to the outside of the commercial material container proximate to its base and the attaching, and joining elements are from a group consisting of adhesive-backed mechanical fasteners and Velcro® fasteners.

8. The base apparatus of claim 1 wherein the sides have a horizontal periphery and the horizontal periphery has a shape of a circle, oval, square, rectangle, or polygon.

9. The base apparatus of claim 1, further comprising, at least one opening through at least the bottom or the side.

10. The storage container apparatus of claim 1 wherein the edge extends outward from the second attachment element at least 0.25 inches.

11. The storage container apparatus of claim 1 wherein the base of the storage container further comprises a hinge attachment that is affixed to one area of the sides to prevent the base from separating completely from the storage container apparatus.

12. The storage container apparatus of claim 1 wherein the base further contains s scrubbing surface on its bottom.

13. The storage container apparatus of claim 1, further comprising, at least one accessory stored within the storage container apparatus.

14. The storage container apparatus of claim 13, further comprising, an opening adaptable to the withdrawal of an accessory such as a wipe from the collection of disposable wipes.

15. The storage container apparatus of claim 1 wherein the attachment elements are from a group consisting of a snap fit set and a friction fit set.

16. A method of using an attachable storage container able to be connected with the bottom of one of at least two commercial material containers containing commercial materials, comprising the steps of:
   a. providing a first commercial material container with material that ranges from solid to liquid to gas;
   b. providing a storage container apparatus, comprising:
      i. a compartment, comprising:
         (a). sides having an outer top edge that is within 0.25 inches of the sides proximate the bottom of the commercial material container, extending downward and ending in an edge with a first attachment element, and
         (b). a base with a top, a bottom, and an edge, the top having a second attachment element that detachably attaches to the first attachment element of the sides and the edge extends outward from the second attachment element at least 0.13 inches; and
      ii. a joining element that is configured to affix the storage compartment proximate to the bottom of a commercial material container;
   c. engaging the joining element to attach the top of the storage container apparatus to the bottom of the commercial material container;
   d. providing a second commercial material container with material that ranges from solid to liquid to gas; and
   e. removing the storage compartment from the bottom of the first commercial material container and engaging the joining element to attach the top of the storage container apparatus to the bottom of the second commercial material container.

17. The method of claim 16 wherein the storage container apparatus further comprises at least one accessory stored within the storage container apparatus and the method, further comprises the step of
   f. using the accessory.

18. The method of claim 17, further comprising the step of
   g. returning the accessory back into the storage container apparatus upon completion of use.

19. The method of claim 16, further comprises the step of
   f. placing in the base at least one accessory that is useful in the use of the material in the commercial material container.

20. The method of claim 16, further comprises the step of
   f. detachably attaching a commercially available scrubbing and cleaning pad to the outside of the base of the storage container apparatus.

21. The method of claim 16 wherein the joining element, comprises, a top having a substantially horizontal top surface and an outer edge that is joined to the outer top edge of the sides of the storage compartment and an adhering element that is configured to affix the top surface of the top of the storage compartment to the bottom of the commercial material container.

* * * * *